United States Patent [19]

Zak

[11] Patent Number: 5,619,404

[45] Date of Patent: Apr. 8, 1997

[54] MULTI-CHANNEL SINGLE STAGE HIGH POWER FACTOR AC TO DC CONVERTER

[76] Inventor: Alexander Zak, 8 Kislev Street, Ashkelon 38721, Israel

[21] Appl. No.: 550,469

[22] Filed: Oct. 30, 1995

[51] Int. Cl.[6] ................................................ H02M 3/335
[52] U.S. Cl. .................................. 363/21; 363/16
[58] Field of Search ................................ 363/16, 20, 21, 363/37, 131

[56] References Cited

U.S. PATENT DOCUMENTS

| | | | |
|---|---|---|---|
| 4,184,197 | 1/1980 | Cuk et al. | 363/16 |
| 4,274,133 | 6/1981 | Cuk et al. | 363/39 |
| 4,355,352 | 10/1982 | Bloom et al. | 363/16 |
| 4,937,726 | 6/1990 | Reustle | 363/21 X |
| 5,331,534 | 7/1994 | Suzuki et al. | 363/20 |
| 5,416,387 | 5/1995 | Cuk et al. | 315/209 R |

*Primary Examiner*—Peter S. Wong
*Assistant Examiner*—Y. J. Han
*Attorney, Agent, or Firm*—Browdy and Neimark

[57] ABSTRACT

A multi-channel single stage high power factor AC to DC converter comprising a pair of input terminals for connecting to an a.c. supply voltage, a bridge rectifier connected across the input terminal, for converting the a.c. supply voltage to a d.c. voltage, and a D.C. to D.C. converter connected to the bridge rectifier and including a high frequency switch for converting the d.c. voltage to high frequency intermittent pulses, a transformer having a primary winding connected to the high frequency switch and having at least two secondary windings each connected to a respective rectifier for producing a d.c. output voltage thereacross. A pair of capacitors are connected in the input of the DC to DC converter so that when the switch is OPEN a first one of the capacitors receives energy from the a.c. supply and a second one of the capacitors receives energy from the transformer, whilst when the switch is CLOSED the first capacitor restores energy to the transformer and the second capacitor restores charge to the a.c. supply. Such a configuration avoids the need to split the energy transfer capacitor between the input and output of the DC to DC converter and thus avoids duplication of part of the energy transfer capacitor in each output channel when multiple outputs are provided.

8 Claims, 9 Drawing Sheets

MULTI-CHANNEL SINGLE STAGE HIGH POWER FACTOR AC TO DC CONVERTER

FIELD OF THE INVENTION

This invention relates to a single stage AC to DC converter having near unity power factor.

BACKGROUND OF THE INVENTION

Presently available AC to DC converters are based on a modular architecture, including an Input Network, a DC to DC converter and a load. The Input Network comprises a high frequency line filter and a slow bridge rectifier whilst the DC to DC converter constitutes the conversion stage of the AC to DC converter. The Input Network is continuously or discontinuously fed AC current from a main AC supply and is converted thereby to an appropriate DC output voltage which supplies power to the DC to DC converter stage. The conversion stage is designed to provide a high power factor rectified DC voltage from the main AC supply.

The benefits of high power factor include reduction in the RMS line current and in the line current harmonic distortions, so that the main AC supply may be more efficiently utilized, on the one hand, and, on the other hand, properly protected against the introduction thereto of harmonic distortions.

Such DC to DC converters are well known in the art and are described, for example, in U.S. Pat. No. 4,274,133 (Cuk et al); U.S. Pat. No. 4,355,352 (Bloom et al) and U.S. Pat. No. 5,416,387 (Cuk et al).

However, before discussing these references, it is instructive to make reference to an even earlier patent to Cuk et al namely U.S. Pat. No. 4,184,197 which issued on Jan. 15, 1980 and may be regarded as a seminal work in the field of DC to DC switching converters. To the extent that there is clearly overlap between the present invention and the above-mentioned U.S. patents and that a full understanding of the principles upon which the present invention is based may be derived from a close inspection of those earlier patents, all four of the above-mentioned U.S. patents are incorporated herein by reference.

U.S. Pat. No. 4,184,197 to which reference has been made discusses a large number of configurations employing high frequency transistor switches and having a nonpulsating input and output current. As explained in column 9 lines 62 ff of that patent, there are many applications of dc-to-dc switching converters wherein it is necessary to incorporate DC isolation between the input and output circuits of the converter. Cuk et al propose that this be achieved in such a manner as also to provide a capability for multiple outputs with different polarities and magnitudes, by employing an isolation transformer having a single primary winding and multiple secondaries. Such an embodiment is shown in FIG. 10 of U.S. Pat. No. 4,184,197 having a single transformer secondary winding for providing a single output only. As explained in column 10 lines 7 ff, the desired isolation is achieved by using two capacitances in place of the single capacitance used in non-isolating configurations such as shown in FIGS. 5(1) and 5(2) of the same patent. The provision of a one-to-one transformer couples the voltages across each of the capacitors so as to provide DC isolation. It is significant that Cuk et al present the circuit shown in FIG. 10 as providing a capability for multiple outputs with different polarities and magnitudes, notwithstanding the fact that FIG. 10 of the patent is clearly directed to a single output stage only.

It will be understood that, in order to extend the configuration shown in FIG. 10 to multiple output stages, the output capacitor must be duplicated in every channel. That is to say that for every secondary winding of the isolation transformer, there must be provided a corresponding output capacitor for storing charge when the so-called primary capacitance charges through the primary winding of the transformer. By such means, the desired power transfer between the input and output is achieved.

However, the output capacitor is typically at least 1000 µF and is therefore a component of significant bulk. Thus, if such a capacitor needs to be connected in each output stage, then it is apparent that when multiple output stages are provided according to the configuration proposed by Cuk et al, then a power supply employing such a AC to DC converter and designed for multiple output stages will be unacceptably bulky.

AC to DC converters of the kind described form the major component in power supplies such as are commonly found in computers and the like. In view of the ever increasing requirement to decrease, as much as possible, the bulk of such computers it is clearly desirable to reduce the volume of the power supply provided therein. However, as is known, power supplies which are used in computers must be provided with multiple outputs in order to supply power to the different components therein requiring different supply voltages. Thus, the requirement to provide multiple output stages whilst, at the same time, reducing bulk to the minimum militates against the use of the circuit configuration proposed by Cuk et al in U.S. Pat. No. 4,184,197 because the provision of a separate output capacitor of significant bulk in each output stage necessarily increases the overall bulk of the resulting power supply.

Figure 1:
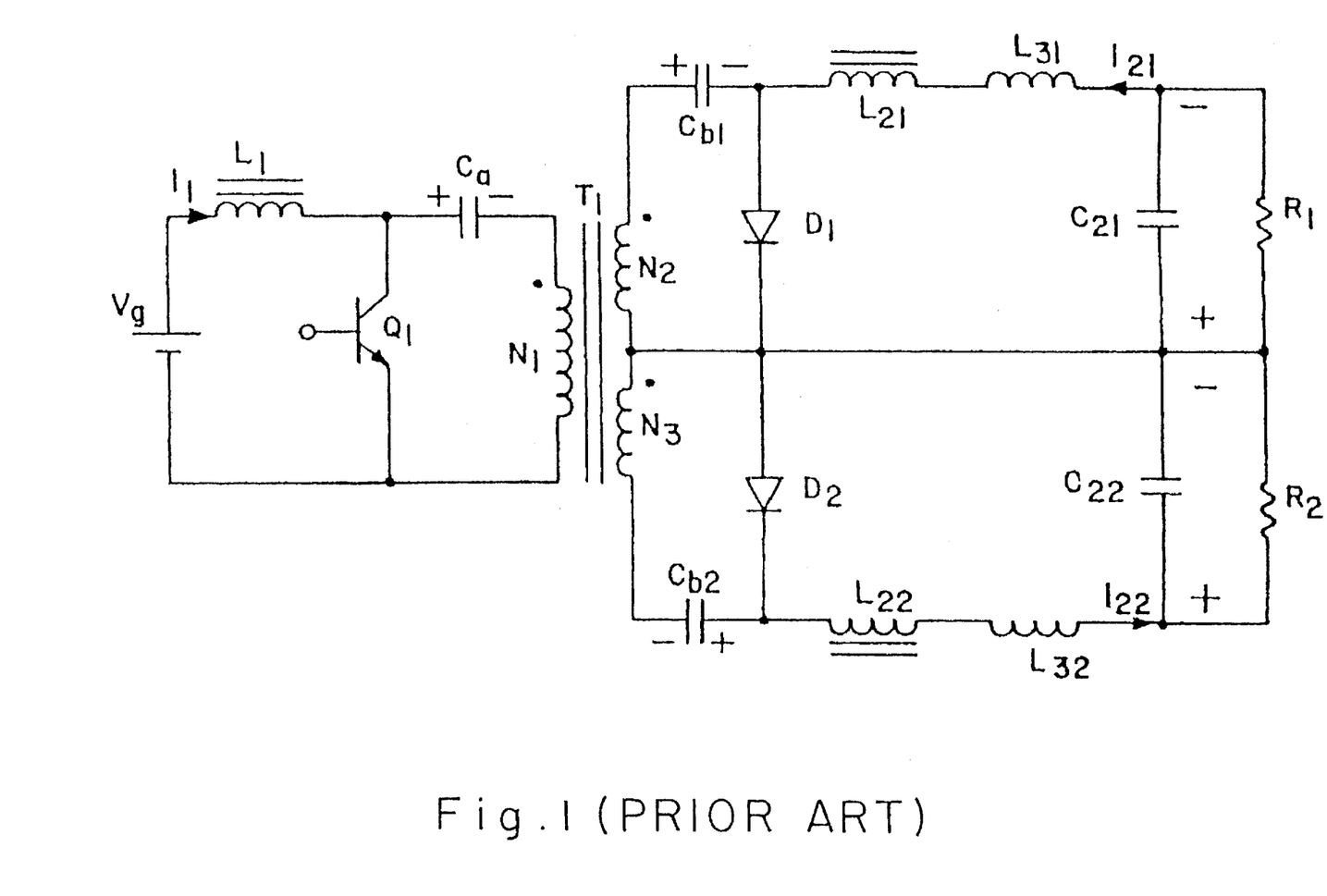
FIG. 1 is a circuit diagram of a prior art multi-channel switching converter as disclosed by Cuk et al in U.S. Pat. No. 4,274,133.

U.S. Pat. No. 4,274,133 (Cuk et al) relates to an extension of the switching converter disclosed in the above-mentioned U.S. Pat. No. 4,184,197. The principal improvement in the later patent resides in the coupling of the inductors into a single magnetic circuit with two windings as described in the earlier patent. The coupling of inductances leads to at least a reduction to half of both current ripples. In order to achieve isolation between the input and output circuits, the energy transfer capacitance is divided into two parts and separated by an isolation transformer. FIG. 1 of the annexed drawings illustrates one possible realization of a switching converter having DC isolation Z between the input (source) circuit and multiple output (load) circuits as described in U.S. Pat. No. 4,274,133. In this case, an isolation transformer is provided and the transfer capacitance is split into a capacitor $C_a$ in the input circuit and a capacitor $C_b$ in the output circuit. In the case where multiple output circuits are provided, then a separate capacitor $C_{b1}$, $C_{b2}$ . . . $C_{bn}$, is provided for each separate output. This is explained in column 4 lines 55 ff of the above-mentioned patent and is shown in FIG. 1 of the annexed drawings for a switching converter having two separate output circuits.

Finally, mention is made of U.S. Pat. No. 5,416,387 (Cuk et al) disclosing a single stage, high power factor, gas discharge lamp ballast based on the principles of the two earlier Cuk et al patents to which reference has already been made. Here again, 5the energy transfer capacitance is split so that a first component thereof is included in the input circuit whilst a second component is provided in the output circuit. The above-mentioned patent issued in May, 1995, i.e. some 15 years after the date of issue of U.S. Pat. No. 4,184,197 wherein a switching converter having multiple outputs is first disclosed. It is very clear that the provision of multiple outputs would completely militate against the requirements of a compact gas discharge lamp ballast which commonly suffer from high bulk owing to the large size and weight of low frequency magnetic ballast. It is apparent that providing multiple outputs in accordance with any of the Cuk et al configurations militates against the requirement for compactness owing to the increased bulk of the energy transfer capacitance which is duplicated in respect of each output circuit.

The above-mentioned U.S. Pat. No. 4,355,352 to Bloom et al attempts to reduces the large number of components in the earliest Cuk et al patent and does so by reducing the number of inductors. However, no reduction in the number of capacitors is proposed notwithstanding their significant bulk.

The above drawbacks notwithstanding, the Cuk et al configurations have become industry standards and it would clearly be desirable to provide a switching converter having all of the many advantages of the Cuk et al configurations, whilst being suitable for multiple output channels without requiring that the energy transfer capacitance be split in the manner shown in the above-discussed Cuk et al patents.

SUMMARY OF THE INVENTION

It is an object of the invention to provide a multi-channel single stage AC to DC converter having a high power factor in which the above-mentioned drawbacks are significantly reduced or eliminated.

According to a broad aspect of the invention there is provided a multi-channel single stage AC to DC converter having a high power factor, comprising:

a pair of input terminals for connecting to an a.c. supply so as to receive an a.c. supply voltage, a bridge rectifier connected across the input terminal, for converting the a.c. supply voltage to a d.c. voltage, and a D.C. to D.C. converter having an input connected to an output of the bridge rectifier for receiving said d.c. voltage, and including a high frequency switch connected to the input for converting the d.c. voltage to high frequency intermittent pulses, a transformer having a primary winding connected to the high frequency switch and having at least two secondary windings each connected to a respective rectifier for producing a d.c. output voltage thereacross;

wherein a pair of capacitors are connected in the input of the DC to DC converter so that when the switch is OPEN a first one of the capacitors receives energy from the a.c. supply and a second one of the capacitors receives energy from the transformer, whilst when the switch is CLOSED the first capacitor restores energy to the transformer and the second capacitor restores energy to the a.c. supply.

In such a configuration, a pair of capacitors are connected in the input of the DC to DC converter so as to effect energy transfer between the input and output thereof. Such a configuration obviates the need to connect part of the energy transfer capacitance in the output circuit of the DC to DC converter, with the result that even when multiple outputs are provided, only the two anti-phase capacitors in the input circuit are required.

BRIEF DESCRIPTION OF THE DRAWINGS

In order to understand the invention and to see how the same may be carried out in practice, some preferred embodiments will now be described, by way of non-limiting example only, with reference to the accompanying drawings, in which:

FIGS. 6 and 7 show, respectively, equivalent circuits of the circuit configuration shown in FIG. 3 during two successive time intervals $T_1$ when the MOSFET is ON and the diode is OFF and $T_2$ during which the MOSFET is OFF and the diode is ON;

DETAILED DESCRIPTION OF PREFERRED EMBODIMENTS

Figure 2:
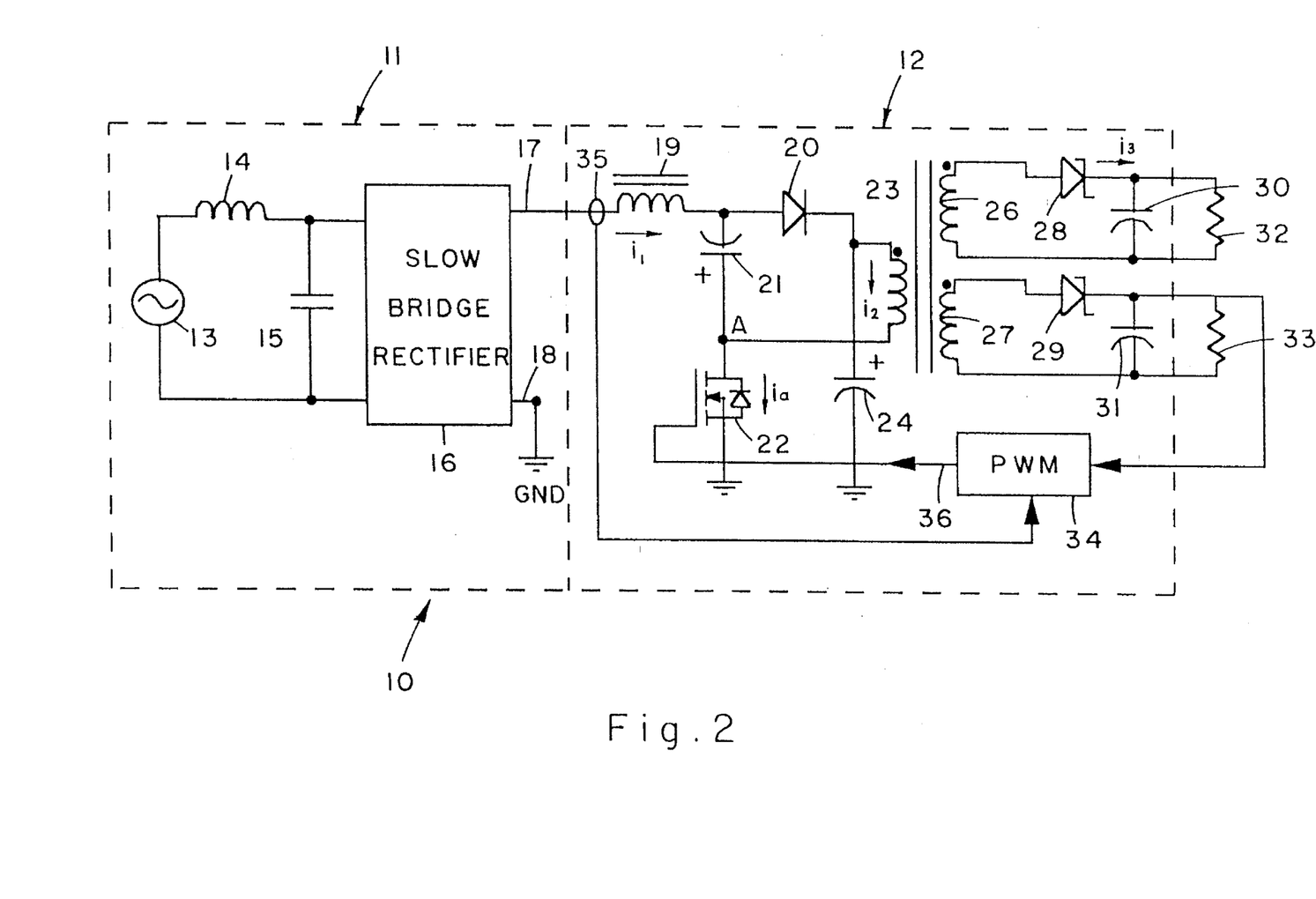
FIGS. 2 and 3 are circuit diagrams of multi-channel switching converters according to first and second embodiments of the invention.

FIG. 2 is a circuit diagram showing schematically a single stage, high power factor AC to DC converter 10 comprising an Input Network 11 and a conversion stage 12. The Input Network 11 comprises a source of AC power 13 coupled, via an electromagnetic interference (EMI) filter comprising an inductor 14 and a capacitor 15 to a slow bridge rectifier 16 having a positive output rail 17 and a negative output rail 18 connected to ground, GND. The positive and negative output rails 17 and 18, respectively, of the slow bridge rectifier 16 are connected to the conversion stage as follows.

The positive output rail 17 is connected via an inductor 19 to the anode of a rectifier diode 20 and to the negative terminal of a holdover capacitor 21 whose positive terminal is connected to the source terminal of a MOSFET 22 whose source terminal is connected to GND, i.e. the negative output rail 18 of the slow bridge rectifier 16.

A primary transformer winding 23 is connected at one end (the dot end) to the cathode of the rectifier diode 20 and at its other end to the common junction between the positive terminal of the holdover capacitor 21 and the drain terminal of the MOSFET 22. An energy transfer capacitor 24 has a positive terminal connected to the cathode of the rectifier diode 20 and has a negative terminal connected to GND.

A pair of transformer secondary windings 26 and 27 each have one end (their dot ends) connected to the anode of a respective Schottky diode 28 and 29 whose cathodes are connected to a positive terminal of a respective filter capacitor 30 and 31 whose negative terminal is connected to the other end of the respective transformer secondary winding 26 and 27. Across each of the filter capacitors 30 and 31 is connected a respective load 32 and 33.

A control signal is fed from the cathode of the Schottky diode 29 to one input of a pulse width modulation circuit (PWM) 34, a second input of which is connected to a current transformer 35 in the positive output rail 17 of the slow bridge rectifier 16 for producing a signal representative of the current flowing therein. An output 36 of the PWM 34 is connected to the gate terminal of the MOSFET 22.

Figure 3:
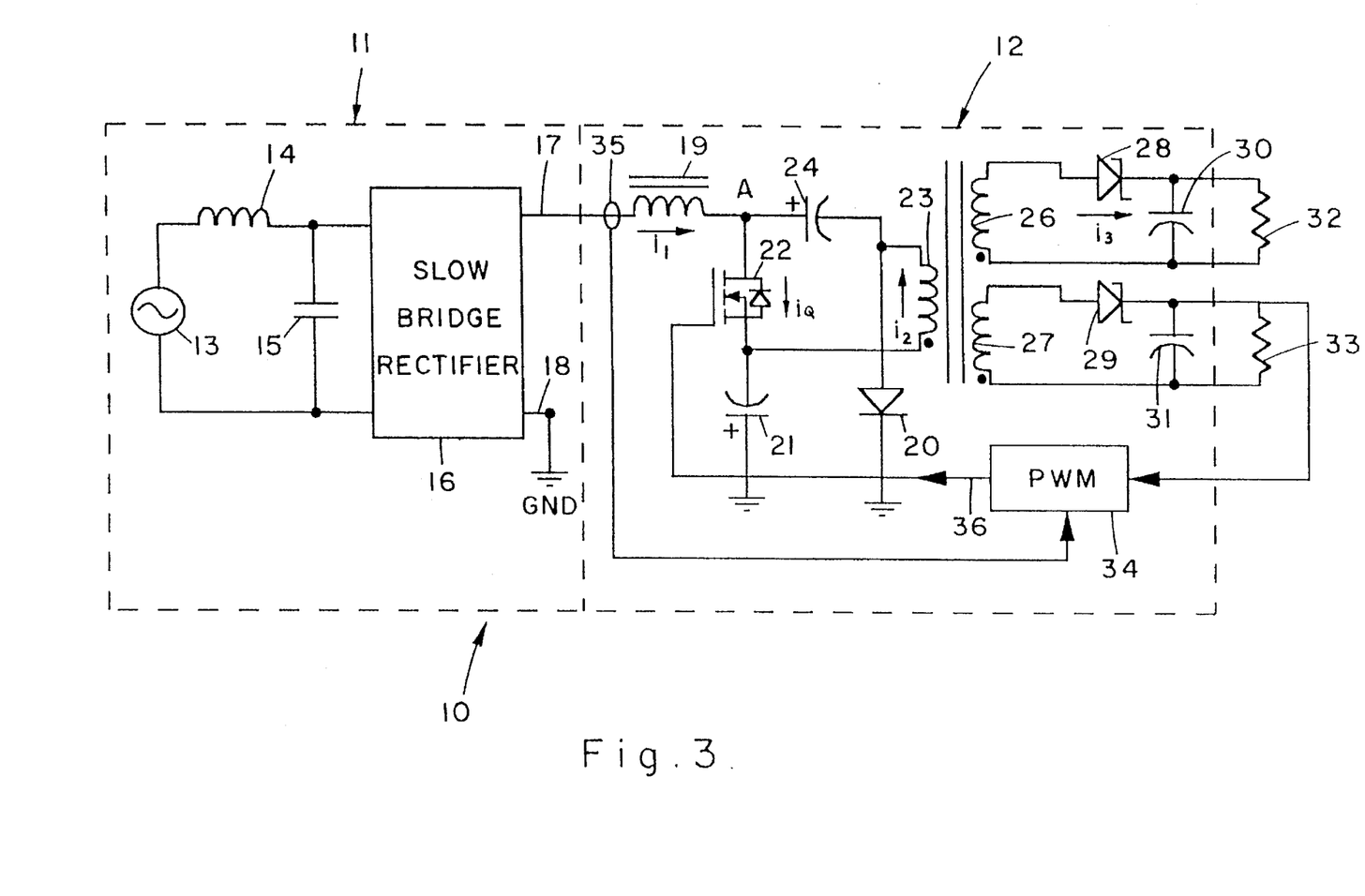

FIG. 3 shows a circuit diagram of an alternative configuration of the AC to DC converter 10 shown in FIG. 2 wherein the connection of the rectifier diode 20, the holdover capacitor 21, the MOSFET 22 and the energy transfer capacitor 24 is modified as will now be explained. The remainder of the circuit is identical to that described above with reference to FIG. 2 of the drawings.

Thus, in the modified circuit configuration shown in FIG. 3, the drain terminal of the MOSFET 22 is connected to the inductor 19 and to the positive terminal of the energy transfer capacitor 24 whose negative terminal is connected to the anode of the rectifier diode 20, the cathode of which is connected to GND, i.e. the negative output rail 18 of the slow bridge rectifier 16. The source of the MOSFET 22 is connected to the negative terminal of the holdover capacitor 21 whose positive terminal is connected to GND. The transformer primary winding 23 is connected with its dot end to the common junction between the source of the MOSFET 22 and the negative terminal of the holdover capacitor 21, its other end being connected to the junction between the negative terminal of the energy transfer capacitor 24 and the anode of the rectifier diode 20.

Having now described the two circuit configurations shown in FIGS. 2 and 3, respectively, their operation will now be described, separately.

Figure 4:
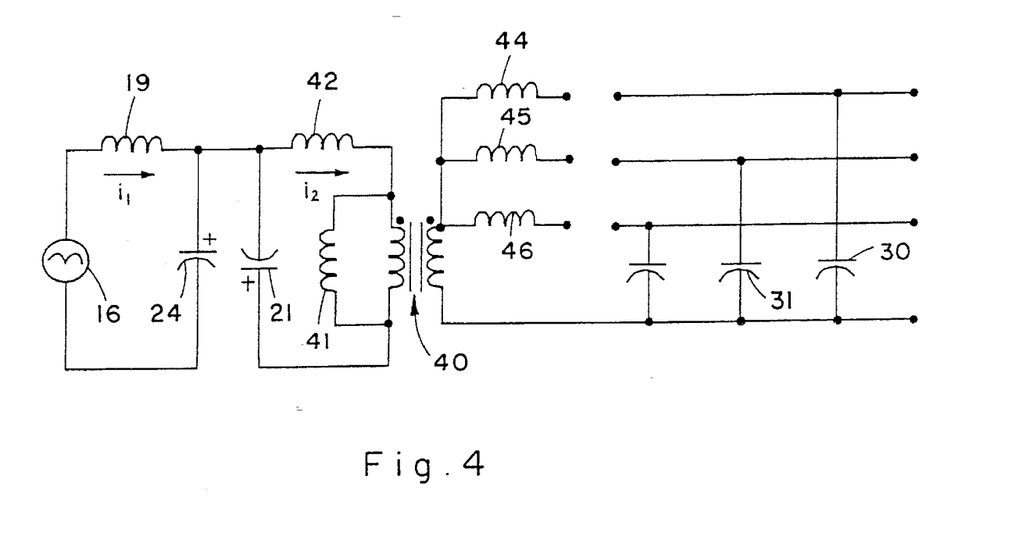
FIGS. 4 and 5 show, respectively, equivalent circuits of the circuit configuration shown in FIG. 2 during two successive time intervals $T_1$ when the MOSFET is OFF and the diode is ON and $T_2$ during which the MOSFET is ON and the diode is OFF.

FIG. 4 is an equivalent circuit diagram to the configuration shown in FIG. 2 when the MOSFET 22 is OFF such that its source and drain terminals are effectively open-circuit. Prior to the MOSFET 22 being switched OFF by the PWM 34, current $i_1$ flows through the inductor 19. Thus, when the MOSFET 22 is now switched OFF, the inductor 19 resists the current change in accordance with Lenz's Law such that the polarity of the voltage across the inductor 19 changes, and the anode of the rectifier diode 20 becomes positive with respect to its cathode. In this case, the rectifier diode 20 is ON whereby the positive terminal of the energy transfer capacitor 24 is effectively short-circuited to the output of the inductor 19 and its negative terminal is connected to GND. Likewise, the holdover capacitor 21 is effectively connected across the transformer primary winding 23. In FIG. 4, the transformer shown in FIG. 2 is represented by an equivalent circuit comprising a lossless transformer 40 across whose primary winding is connected an inductance 41 representing magnetic losses and in series with whose primary winding there is connected an inductance 42 representing the primary leakage losses. Likewise, each transformer secondary winding is represented by an inductance 44, 45 and 46 each representing the secondary winding leakage losses for a respective one of three outputs. It is thus apparent from FIG. 4 that the slow bridge rectifier 16 conducts current $i_1$ through the energy transfer capacitor 24 to GND such that the current enters the positive terminal, thereby charging the energy transfer capacitor 24. In other words, the energy transfer capacitor 24 receives energy from the input network 11 (via the slow bridge rectifier 16). Likewise, the transformer 23 feeds current $i_2$ through the rectifier diode 20 and the positive terminal of the holdover capacitor 21 such that it too stores energy from the transformer 23.

Since the MOSFET 22 is OFF, the second terminal (i.e. the non-dot end) of the transformer primary winding 23 is not short-circuited to GND but is held at a positive potential equal to the voltage across the holdover capacitor 21. As a result, the dot end of the transformer primary winding 23 is negative relative to its other end and, by induction, the dot ends of the secondary windings 26 and 27 are also negative. As a result, the Schottky diodes 28 and 29 are reverse biased and are consequently open-circuit, so that the filter capacitors 30, 31 are effectively disconnected from the transformer secondary windings. In this condition, power is only transferred to the load by means of the residual energy stored in the respective filter capacitors since the load is disconnected from the transformer secondary winding. At the same time, the energy stored magnetically in the core of the transformer 40 charges the holdover capacitor 21 so that energy is transferred from the transformer 40 to the holdover capacitor 21, thereby preventing the transformer 40 from becoming saturated.

Thus, in the case that the MOSFET 22 is OFF, then for the time period during which the rectifier diode 20 conducts, the equivalent circuit is as shown in FIG. 4, from which it is seen that the energy transfer capacitor 24 receives energy via the inductor 19 from the Input Network 11 and, at the same time, the holdover capacitor 21 receives energy from the transformer 40.

Figure 5:
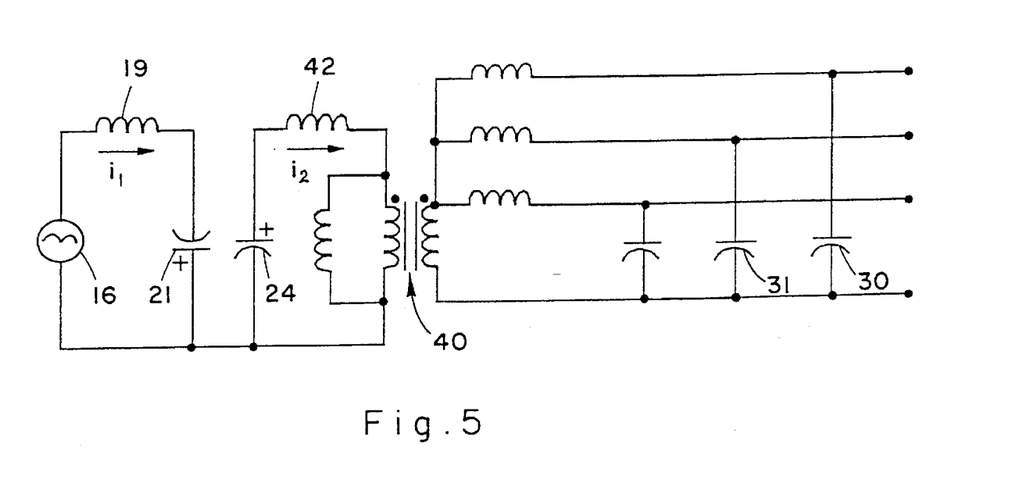

FIG. 5 depicts the corresponding situation when the MOSFET 22 is ON. In this case, the holdover capacitor 21 and the energy transfer capacitor 24 are connected in series so as to apply a positive potential to the cathode 20 of the rectifier diode 20. Consequently the rectifier diode 20 is reverse biased and OFF. The holdover capacitor 21 is therefore connected via the MOSFET 22 across the slow bridge rectifier 16 such that the positive terminal of the holdover capacitor 21 is connected to the negative output rail 18 thereof. In this case, current $i_1$ flows into the negative terminal of the holdover capacitor 21 which thus restores its stored energy to the Input Network 11. At the same time, since the rectifier diode 20 is open-circuit, the energy transfer capacitor 24 is effectively connected across the transformer primary winding 23 with its positive terminal connected to the dot end thereof. In this case, current $i_2$ enters the negative terminal of the energy transfer capacitor 24 which consequently restores charge to the transformer 40. Since the dot end of the transformer primary winding 23 is positive, the dot ends of the transformer secondary windings are likewise positive and the Schottky diodes in each of the output channels conduct. The respective filter capacitors, e.g. 30 and 31 are thus connected between the output of the respective inductances 44, 45 and GND so as to receive energy from the transformer 40. Thus, in this situation, the transformer 40 receives energy from the energy transfer capacitor 24 so as to supply voltage to the output channels of the DC to DC converter whilst the Input Network 11 receives energy from the holdover capacitor 21, thereby preserving nearly unity power factor.

It will thus be seen that the energy transfer capacitor 24 effects energy transfer between the Input Network 11 and the transformer 40, whilst the holdover capacitor 21 allows for the restoration of residual, superfluous power either to the Input Network 11 or to the transformer 40. The holdover capacitor 21 also exchanges the voltage applied to the transformer and reduces the transformer current.

From the equivalent circuits shown in FIGS. 4 and 5, several important facts emerge which distinguish the invention from any of the prior art configurations discussed above. First, it is to be noted that both the holdover capacitor 21 and the energy transfer capacitor 24 are included in the input side of the DC to DC converter 12. This is in contrast to those prior art configurations discussed above wherein only the holdover capacitor is completely included in the input side of the DC to DC converter, whilst the energy transfer capacitor is split between the input and the output. Secondly, and following on from this distinction, is the fact that the same single energy transfer capacitor 24 connected in the input side of the DC to DC converter in the invention serves any number of output channels. This again is in distinction to the prior art configurations of record wherein, because some of the energy transfer capacitor is included in the output circuit, a separate capacitor must be provided for every output channel. Finally, and again following on from this important distinction, the energy transfer capacitor in no way affects the bulk of the resulting AC to DC converter 10 regardless of how many output channels are provided. Of course, no attempt is made to disguise the fact that a separate filter capacitor 30, 31 etc. will indeed be required for each output channel but this also is the case in the prior art configurations and cannot be avoided. The invention does, however, avoid unnecessary duplication of a component of the energy transfer capacitor in each output channel and this does, indeed, very significantly reduce the overall bulk of the AC to DC converter particularly in the case when multiple output channels are provided as is typically done in computer power supplies.

Figure 6:
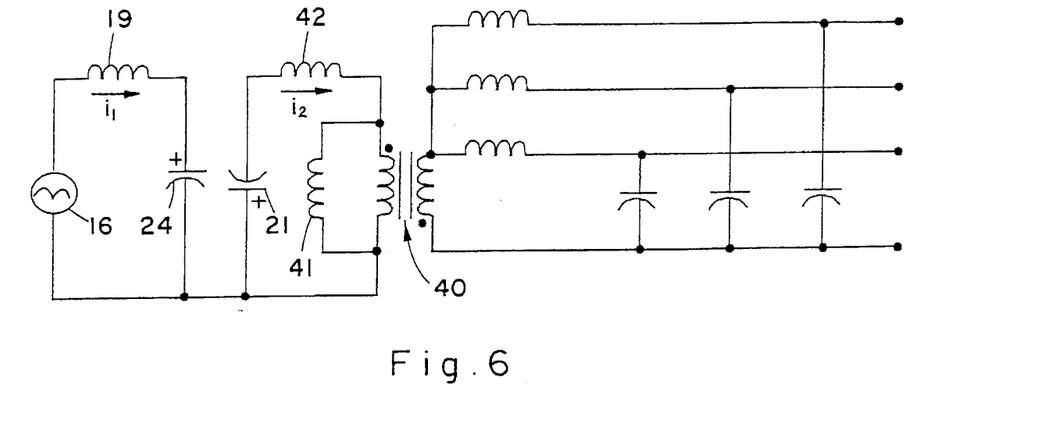
Figure 7:
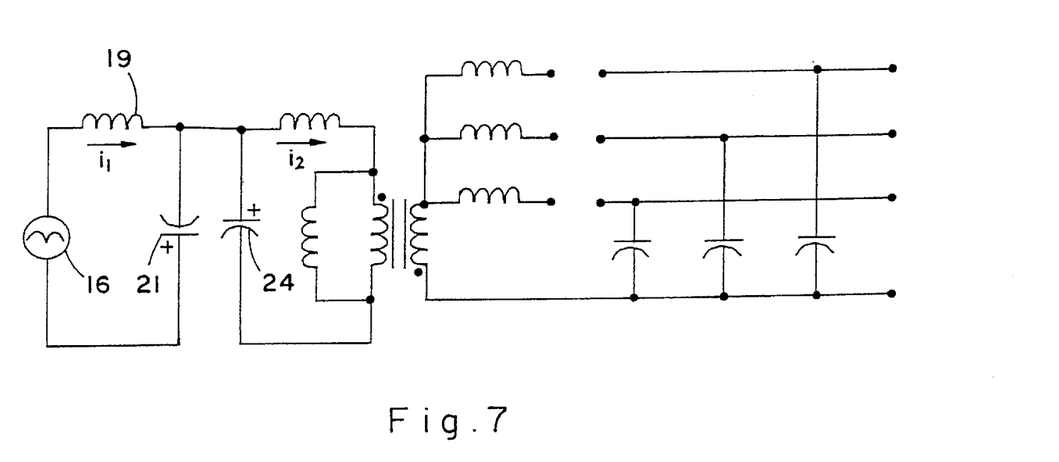

FIGS. 6 and 7 are equivalent circuits to the configuration shown in FIG. 3 and, to the extent that the equivalent circuits shown in FIGS. 6 and 7 are similar to those already described with reference to FIGS. 4 and 5, identical reference numerals will be employed.

FIG. 6 depicts the situation where the MOSFET 22 shown in FIG. 3 is OFF and the rectifier diode 20 is ON, whereupon the holdover capacitor 21 is connected across the primary winding of the transformer which, again, is represented as a lossless transformer 40 across whose primary is connected an inductance 41 representing magnetic losses and in series with whose primary is connected a second inductance 42 representing primary leakage losses. During the period of time that the MOSFET 22 is OFF, the rectifier diode 20 is effectively short-circuited and the energy transfer capacitor 24 is connected between the inductor 19 and GND so that current $i_1$ is fed into its positive terminal. In this condition, the energy transfer capacitor 24 receives energy from the Input Network 11.

Further, it will be seen that the positive terminal of the holdover capacitor 21 is connected to the non-dot end of the transformer primary winding with the consequence that the non-dot end of the secondary winding is also positive. The Schottky diode in each output channel therefore conducts and may therefore be represented as a short-circuit so that the filter capacitor in each of the output channels is simply connected across the respective transformer secondary winding. Furthermore, the current $i_2$ flows into the positive terminal of the holdover capacitor such that it receives energy from the transformer 40.

Thus, in this condition, the energy transfer capacitor 24 receives energy from the slow bridge rectifier 16 whilst the holdover capacitor 21 receives energy from the transformer which, at the same time, also supplies energy to each of the output channels of the DC to DC converter and charges the respective filter capacitors 30, 31 etc. in each of the output channels.

FIG. 7 is the equivalent circuit diagram for the configuration shown in FIG. 3 when the MOSFET 22 is ON. As explained above with reference to FIG. 2, both the holdover capacitor 21 and the energy transfer capacitor 24 are series coupled with their negative terminals connected to the anode of the rectifier diode 20. The rectifier diode is therefore reverse biased and OFF. In this case, the holdover capacitor 21 has its positive terminal connected to GND and its negative terminal is connected, via the MOSFET 22, to the inductor 19. Likewise, the energy transfer capacitor 24 is effectively connected across the transformer primary winding 23 via the MOSFET 22 with its positive terminal connected to the dot end thereof. Current $i_1$ thus flows from the slow bridge rectifier 16 into the negative terminal of the holdover capacitor 21, thereby restoring energy to the Input Network and preserving near unity power factor, whilst current $i_2$ flows into the negative terminal of the energy transfer capacitor 24 which thus restores energy to the transformer. Further, since the dot end of the transformer primary winding is positive, the non-dot end thereof is negative and the non-dot end of each secondary winding is also negative. Consequently, the anode of the respective Schottky diode in each of the output channels is negative and so the Schottky diode is non-conducting. As a result, each of the filter capacitors in the respective output channel is disconnected from the respective transformer secondary winding as shown in FIG. 7. When this happens, any load connected across the output channels continues to derive energy from the filter capacitors as they discharge.

Thus, the equivalent circuit diagrams shown in FIGS. 6 and 7 of the circuit configuration depicted in FIG. 3 also indicate that the energy transfer capacitor 24 effects energy transfer between the Input Network 11 and the transformer 40, whilst the holdover capacitor 21 allows for the restoration of residual, superfluous power to the Input Network 11 from the transformer 40. The holdover capacitor 21 also exchanges the voltage applied to the transformer and reduces the transformer current. Again, it is to be noted that the energy transfer capacitor 24 is fully contained within the input side of the DC to DC converter and no component thereof is included in the output. As a result, no additional bulk is produced by the need to duplicate a component of the energy transfer capacitor in each output channel as is the case in the prior art configurations discussed above.

It will apparent from the foregoing description, that the principal distinction between the two circuit configurations shown in FIGS. 2 and 3 resides in the connection of the holdover capacitor 21 to the transformer primary winding 23 as shown in the equivalent circuits of FIGS. 4 and 6, respectively. The arrangement in FIG. 2 is a back converter wherein, as seen in FIG. 4, the holdover capacitor 21 is connected to receive energy from the transformer when it is disconnected from the load, preventing transformer saturation and suitable for constant loads. The arrangement in FIG. 3 is a booster or flyback converter wherein, as seen in FIG. 6, the holdover capacitor 21 is connected to receive residual energy from the transformer when it is connected to the load, thus being suitable for varying loads.

Figures 8A, 8B:
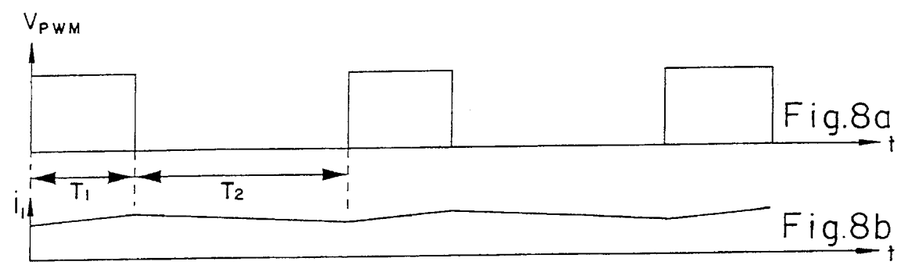
FIGS. 8a to 8f show schematically various voltage and current waveforms associated with the circuit configuration shown in FIG. 2 during the time intervals $T_1$ and $T_2$.

Referring now to FIG. 8a there are shown two time intervals $T_1$ and $T_2$ during which the PWM 34 shown in FIG. 2 is respectively conducting and non-conducting. Thus, during the time interval $T_1$, current is fed to the gate of the MOSFET 22 which thus conducts whilst during the time interval $T_2$, no current is fed to the gate of the MOSFET 22 which thus becomes open-circuit.

FIG. 8b depicts the current it flowing from the slow bridge rectifier 16 through the energy transfer capacitor 24 during the time interval $T_1$. The current $i_1$ increases as the energy transfer capacitor 24 charges up to its maximum value and, during the time interval $T_2$, the current $i_1$ fed by the slow bridge rectifier 16 falls as the holdover capacitor 21 actually restores energy to the AC supply.

Figure 8C:
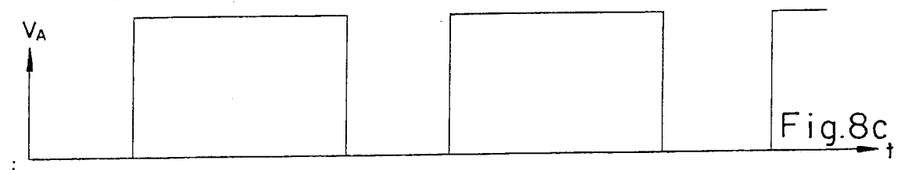

FIG. 8c shows the voltage $V_A$, being the voltage across the MOSFET 22.

Figure 8D:
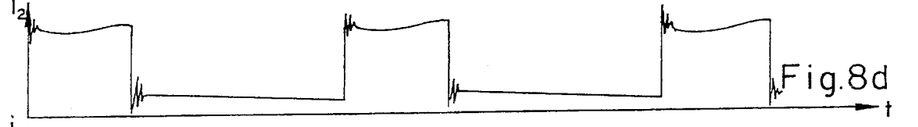

FIG. 8d shows the current $i_2$ flowing through the transformer primary winding 23. During the time interval $T_1$, the MOSFET 22 conducts and, as better seen in the equivalent circuit shown in FIG. 5, the energy transfer capacitor 24 discharges through the transformer primary winding. Consequently, current $i_2$ increases until the MOSFET 22 ceases to conduct, whereupon the situation changes very abruptly and, as shown in FIG. 4, the holdover capacitor 21 receives energy from the transformer so that the magnetic field in the transformer core is reduced and the current $i_2$ falls.

Figure 8E:
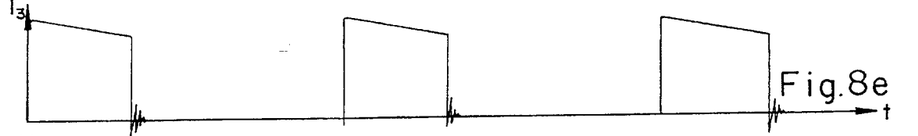

FIG. 8e shows the current $i_3$ flowing through the Schottky diode in each of the output channels. As clearly seen in FIG. 4, when the MOSFET 22 is OFF, the Schottky diode in each of the output channels is open-circuit and so the current $i_3$ is zero. During the time interval $T_1$ when the MOSFET 22 is ON, the current $i_3$ steadily falls as the respective filter capacitors are charged.

Figure 8F:
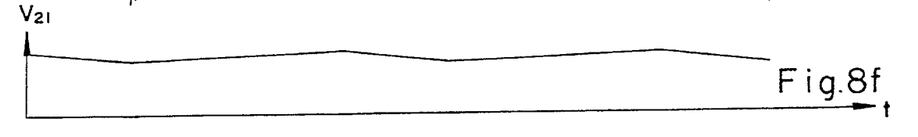

FIG. 8f shows the voltage $V_{21}$ across the holdover capacitor 21. During the time interval $T_1$ when the MOSFET 22 is ON, the holdover capacitor 21 restores energy to the slow bridge rectifier 16 and so its voltage falls. During the time interval $T_2$ when the MOSFET 22 is OFF, the holdover capacitor 21 is charged by the transformer and so its voltage increases.

FIGS. 9a to 9g show similar waveforms for the circuit configuration of FIG. 3.

Figure 9A:
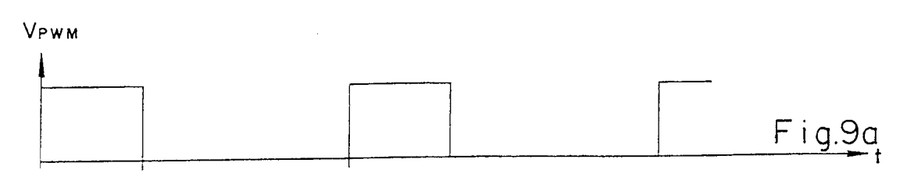
FIGS. 9a to 9g show schematically various voltage and current waveforms associated with the circuit configuration shown in FIG. 3 during the time intervals $T_1$ and $T_2$.

Thus, FIG. 9a shows the voltage across the PWM 34 during the respective time intervals $T_1$ and $T_2$ when the PWM 34 conducts and stops conducting, respectively.

Figures 9B, 9C:
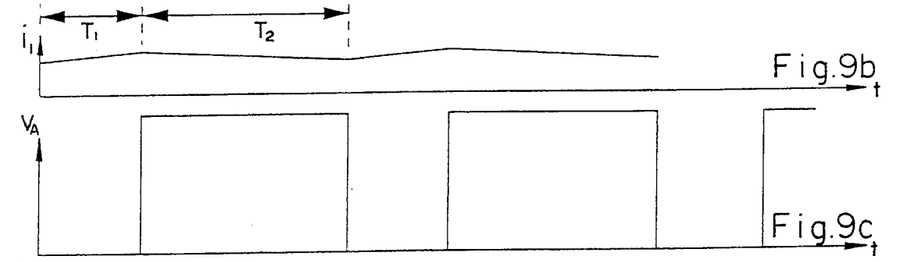

FIG. 9b shows the current $i_1$ flowing through the inductor 13. During the time interval $T_1$ when the MOSFET 22 is ON, the holdover capacitor 21 restores energy to the slow bridge rectifier 16 via the inductor 19 and so the current $i_1$ rises. During the time interval $T_2$ when the MOSFET 22 is OFF, the energy transfer capacitor 24 is charged from the slow bridge rectifier 16 via the inductor 19 and so the current $i_1$ falls.

Figure 9D:
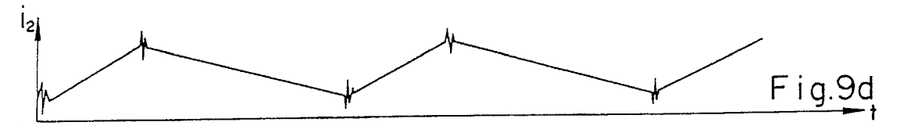

FIG. 9c shows the voltage $V_A$ across the MOSFET 22 and FIG. 9d shows the current $i_2$ flowing through the transformer primary winding 23. During the time interval $T_1$ when the MOSFET 22 is ON, the energy transfer capacitor 24 discharges through the transformer primary winding and so the current $i_2$ increases. During the time interval $T_2$ when the MOSFET 22 is OFF, the holdover capacitor 21 receives energy from the transformer and so the current $i_2$ falls.

Figure 9E:
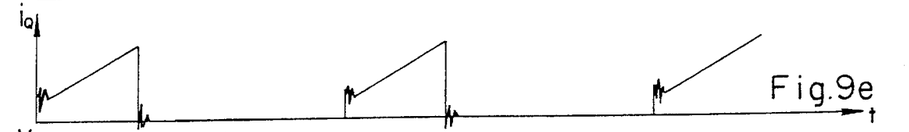

FIG. 9e shows the current $i_Q$ flowing through the MOSFET 22 which rises during the time interval $T_1$ when the MOSFET 22 is ON and is zero during the time interval $T_2$ when the MOSFET 22 is OFF.

Figure 9F:
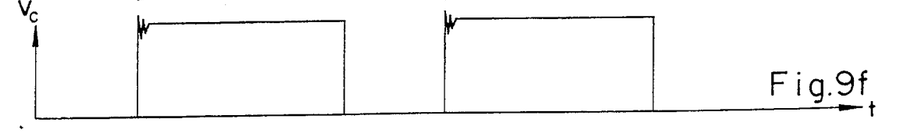
Figure 9G:
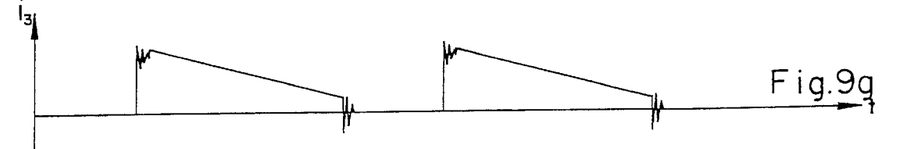

FIGS. 9f and 9g show, respectively, the voltage $V_C$ appearing across the respective transformer secondary winding and the current $i_3$ flowing through the respective Schottky diode in each output channel. During the time interval $T_1$ when the MOSFET 22 is ON, the Schottky diode in each of the output channels is OFF as shown in FIG. 7 and so no current flows therethrough and, likewise, since each of the transformer secondary windings is floating, the voltage $V_C$ is also zero. During the time interval $T_2$ when the MOSFET 22 is ON, the situation is as shown in FIG. 6 and there exists voltage across each of the transformer secondary windings and current flows through each of the Schottky diodes connected thereto.

Figure 10A:
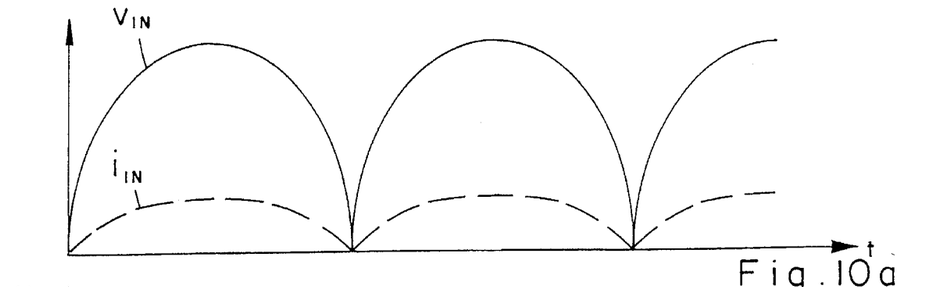
FIGS. 10a to 10c are schematic representations of various voltage and current waveforms relating to two low frequency time periods during the operation of the circuit configuration shown in FIG. 2.
Figures 10B, 10C:
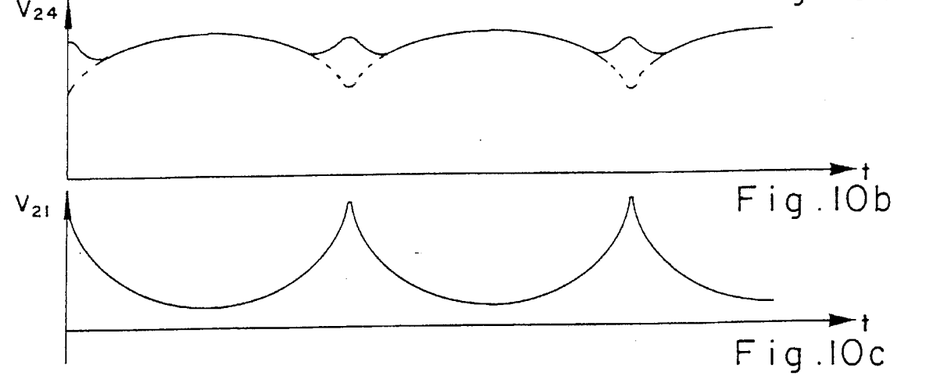

FIGS. 10a to 10c are schematic representations of various voltage and current waveforms relating to two low frequency time periods during the operation of the circuit configuration shown in FIG. 2. In FIG. 10a, it is seen that $V_{IN}$ and $I_{IN}$ are substantially in phase indicating that the power factor is nearly unity. From FIG. 10b which represents the voltage $V_{24}$ across the energy transfer capacitor 24 it is to be noted that the PWM 34 maintains its voltage nearly constant by adjusting the time periods during which the energy transfer capacitor 24 receives energy from the Input Network 11 and discharges through the transformer. The dotted line shows what would be the voltage across the energy transfer capacitor 24 in the absence of the holdover capacitor 21. As is seen from FIG. 10c which shows the voltage across the holdover capacitor 21, $V_{21}$ is in anti-phase to the input voltage and is maximum when $V_{24}$ is minimum. At the zero-crossing point when there is no power input, the holdover capacitor 21 discharges through the inductor 19 and so slightly raises the voltage $V_{24}$ across the energy transfer capacitor 24.

Figure 11A:
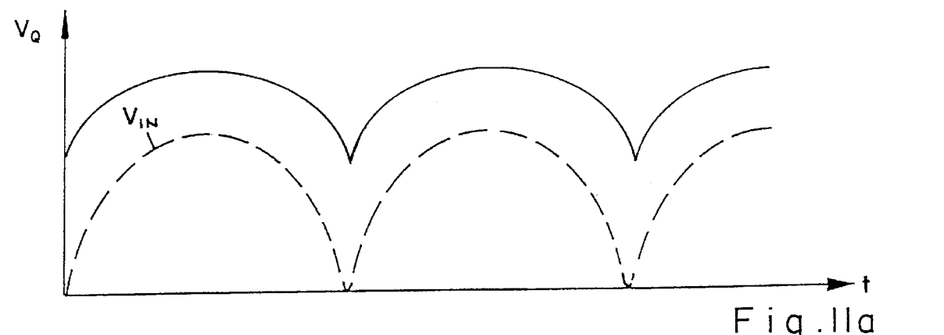
FIGS. 11a and 11b are schematic representations of various voltage and current waveforms relating to two low frequency time periods during the operation of the circuit configuration shown in FIG. 3.
Figure 11B:
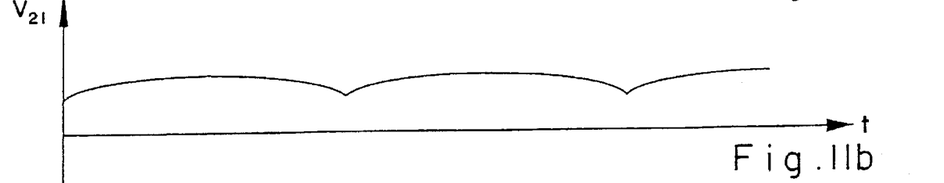

FIGS. 11a and 11b are schematic representations of various voltage and current waveforms relating to two low frequency time periods during the operation of the circuit configuration shown in FIG. 3. FIG. 11a depicts the voltage $V_{MOSFET}$ across the energy transfer capacitor 24 in full outline and the input voltage $V_{IN}$ in dashed outline. The two voltage waveforms are in phase but displaced by the almost constant d.c. level of the voltage $V_{21}$ across the holdover capacitor 21 which is maintained substantially uniform by the PWM 34.

Figure 12:
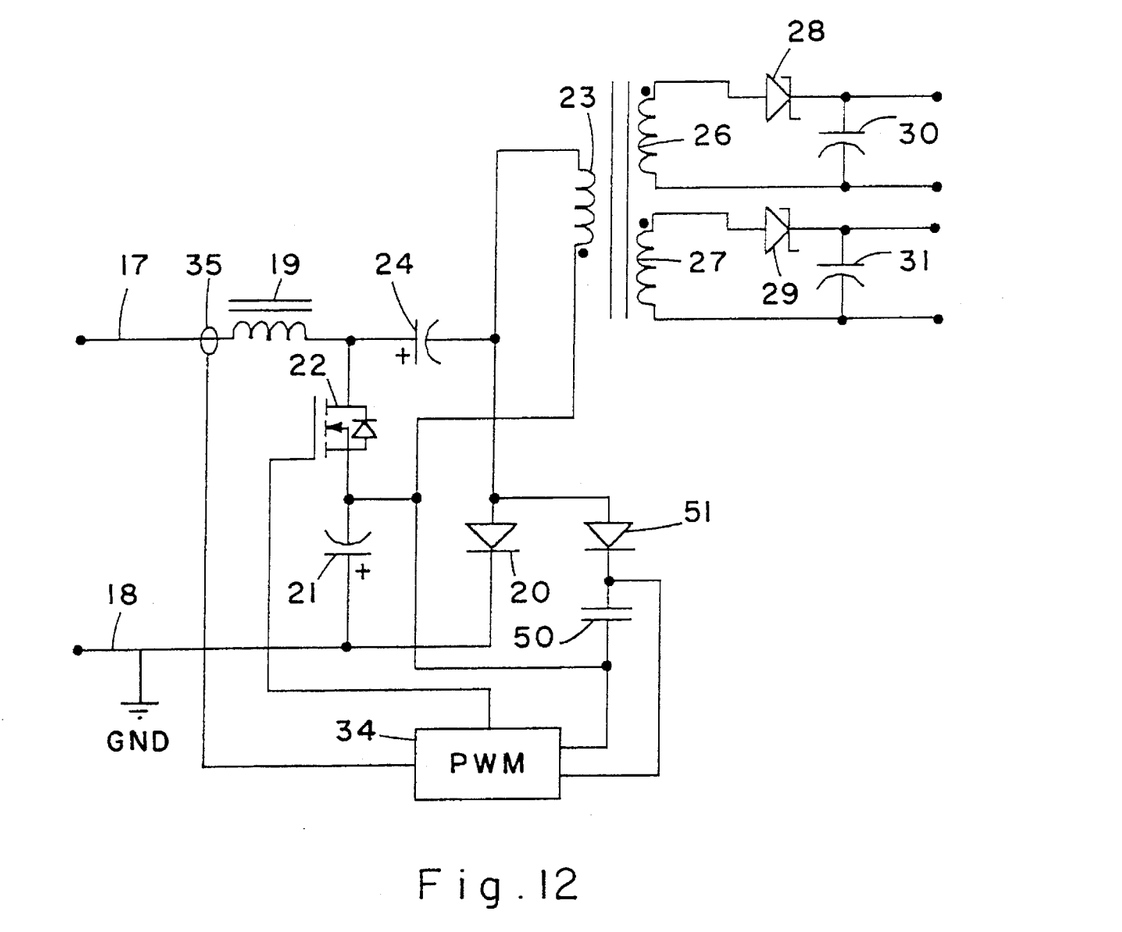
FIG. 12 is a circuit diagram of a feedback arrangement for use with the circuit configuration shown in FIG. 3.

FIG. 12 shows a stabilization loop for use with the circuit configuration shown in FIG. 3. As shown in FIG. 3, a stabilization loop can be closed via one of the output channels of the AC to DC converter 10; or, alternatively, via the holdover capacitor 21; or via an auxiliary capacitor 50 connected to the cathode of an auxiliary rectifier diode 51 whose anode is connected to the anode of the rectifier diode 20 and the non-dot end of the transformer primary winding 23. The voltage level across the auxiliary capacitor 50 is equal to that on the holdover capacitor 21 because, when the rectifier diode 20 is ON, the holdover capacitor 21 is coupled to the auxiliary capacitor 50 via the auxiliary diode 51 and so charges the auxiliary capacitor 50 until its voltage equals that of the holdover capacitor 21, whereupon further current flow through the auxiliary diode 51 is prevented.

I claim:

1. A multi-channel single stage AC to DC converter having a high power factor, comprising:

a pair of input terminals for connecting to an a.c. supply so as to receive an a.c. supply voltage, a bridge rectifier connected across the input terminal, for converting the a.c. supply voltage to a d.c. voltage, and a D.C. to D.C. converter having an input connected to an output of the bridge rectifier for receiving said d.c. voltage, and including a high frequency switch connected to the input for converting the d.c. voltage to high frequency intermittent pulses, a transformer having a primary winding connected to the high frequency switch and having at least two secondary windings each connected to a respective rectifier for producing a d.c. output voltage thereacross;

wherein a pair of capacitors are connected in the input of the DC to DC converter so that when the switch is OPEN a first one of the capacitors receives energy from the a.c. supply and a second one of the capacitors receives energy from the transformer, whilst when the switch is CLOSED the first capacitor restores energy to the transformer and the second capacitor restores energy to the a.c. supply.

2. The AC to DC converter according to claim 1, wherein the DC to DC converter comprises:

a main rectifier diode having an anode and a cathode, an inductor connected between a positive output rail of the bridge rectifier and the anode of the main rectifier diode as well as to a negative terminal of said second capacitor, the cathode of the main rectifier diode being connected to a first end of the transformer primary winding as well as to a positive terminal of the first capacitor whose negative terminal is connected to a negative output rail of the bridge rectifier, a first end of the high frequency switch being connected to a positive terminal of the second capacitor and a second end of the transformer primary winding, and a second end of the high frequency switch being connected to the negative output rail of the bridge rectifier, at least two transformer secondary windings each coupled via a negative rectifier means to a respective output, a respective filter capacitor connected across each output, and a switch control circuit coupled to the high frequency switch for repeatedly opening and closing the switch.

3. The AC to DC converter according to claim 2, wherein the high frequency switch is a MOSFET.

4. The AC to DC converter according to claim 3, wherein the switch control current comprises:

a pulse width modulator (PWM) connected to one of the outputs for feeding a control signal to the gate of said MOSFET.

5. The AC to DC converter according to claim 1, wherein the DC to DC converter comprises:

a main rectifier diode having an anode and a cathode, a inductor having a first end connected to a positive output rail of the bridge rectifier and a second end commonly connected to a first end of the high frequency switch and a positive terminal of the first capacitor, the second capacitor having a negative terminal connected to a second end of the high frequency switch and to the first end of the transformer primary winding and said second capacitor having a positive terminal connected to a negative output rail of the bridge rectifier, a negative terminal of the first capacitor being connected to a second end of the transformer primary winding as well as to the anode of the main rectifier diode whose cathode is connected to the negative output rail of the bridge rectifier, at least two transformer secondary windings each coupled via a respective rectifier means to a respective output, a respective filter capacitor connected across each output, and a switch control circuit coupled to the high frequency switch for repeatedly opening and closing the switch.

6. The AC to DC converter according to claim 5, wherein the high frequency switch is a MOSFET.

7. The AC to DC converter according to claim 6, wherein the switch control current comprises:

a pulse width modulator (PWM) connected to one of the outputs for feeding a control signal to the gate of said MOSFET.

8. The AC to DC converter according to claim 6, wherein the switch control circuit comprises:

an auxiliary rectifier diode having an anode connected to the anode of the main rectifier diode and having a cathode connected to a first terminal of an auxiliary capacitor whose second terminal is connected to the first end of the transformer primary winding, a current sensor in the positive output rail of the bridge rectifier for producing a signal which is a function of the current flowing therethrough, and a pulse width modulator (PWM) having respective input and ground terminals connected across the auxiliary capacitor and having a positive supply terminal connected to the current sensor and an output terminal connected to the gate of said MOSFET.

* * * * *